(12) United States Patent
Kyoden et al.

(10) Patent No.: US 8,905,170 B2
(45) Date of Patent: Dec. 9, 2014

(54) LOW-SLUNG ELECTRIC VEHICLE

(71) Applicant: Honda Motor Co., Ltd., Tokyo (JP)

(72) Inventors: Motoshi Kyoden, Wako (JP); Akito Hiramatsu, Wako (JP); Haruka Miyakawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 13/847,865

(22) Filed: Mar. 20, 2013

(65) Prior Publication Data

US 2013/0256046 A1 Oct. 3, 2013

(30) Foreign Application Priority Data

Mar. 30, 2012 (JP) .................................. 2012-081512

(51) Int. Cl.
*B60R 16/04* (2006.01)
*B62M 7/12* (2006.01)
*B60K 1/04* (2006.01)

(52) U.S. Cl.
CPC ........... *B60K 1/04* (2013.01); *B60K 2001/0494* (2013.01); *B60Y 2200/126* (2013.01); *B62M 7/12* (2013.01); *Y02T 90/124* (2013.01); *B60K 2001/0422* (2013.01); *B62K 2208/00* (2013.01); *B62K 2202/00* (2013.01); *B60K 2001/0483* (2013.01)
USPC ........................... 180/68.5; 180/65.1; 180/220

(58) Field of Classification Search
USPC ............ 180/65.1, 220, 312, 311, 68.5, 65.31, 180/219
See application file for complete search history.

(56) References Cited

U.S. PATENT DOCUMENTS

| | | | | |
|---|---|---|---|---|
| 1,843,691 A | * | 2/1932 | Mancha et al. | 105/51 |
| 3,477,538 A | * | 11/1969 | Hall et al. | 180/65.1 |
| 3,930,552 A | * | 1/1976 | Kunkle et al. | 180/68.5 |
| 4,726,439 A | * | 2/1988 | Iwao et al. | 180/219 |
| 4,967,864 A | * | 11/1990 | Boyer et al. | 180/65.1 |
| 5,570,752 A | * | 11/1996 | Takata | 180/206.4 |
| 5,633,095 A | * | 5/1997 | Ishikawa et al. | 429/1 |
| 6,357,070 B1 | * | 3/2002 | Venard et al. | 15/50.1 |
| 6,691,813 B2 | * | 2/2004 | Schless | 180/220 |
| 7,267,190 B2 | * | 9/2007 | Hirano | 180/65.1 |

(Continued)

FOREIGN PATENT DOCUMENTS

| | | |
|---|---|---|
| DE | 696 15 908 T2 | 4/2002 |
| JP | 2000-294301 A | 10/2000 |
| JP | 3395934 B2 | 4/2003 |

*Primary Examiner* — Katy M Ebner
*Assistant Examiner* — Emma K Frick
(74) *Attorney, Agent, or Firm* — Birch, Stewart, Kolasch & Birch, LLP

(57) ABSTRACT

A low-slung electric vehicle that facilitates the operation of mounting and removing a battery unit while also preventing the rattling of the mounted battery unit. In addition, the battery unit is capable of preventing an operator from forgetting to disconnect a cable when removing the battery unit. A battery unit is provided with rolling rollers. Recesses are formed in upper sides of guide rails to accommodate the rolling rollers to permit the rolling rollers to drop therein when the battery unit is moved to a terminal position. Engaging projections and engagement holes are formed on a lower side of the battery unit and an upper side of a floor plate such that the engaging projections and the engagement holes are fitted to each other when the rolling rollers drop into the recesses. After an access gate is closed, a connecting cable is looped over a part of the access gate.

20 Claims, 15 Drawing Sheets

(56) References Cited

U.S. PATENT DOCUMENTS

| | | | |
|---|---|---|---|
| 7,604,078 B2 * | 10/2009 | Okamoto et al. | 180/206.1 |
| 8,376,076 B2 * | 2/2013 | Kataoka et al. | 180/68.5 |
| 8,413,947 B2 * | 4/2013 | Chiang | 248/553 |
| 8,662,232 B2 * | 3/2014 | Nakamura et al. | 180/220 |
| 8,746,391 B2 * | 6/2014 | Atsuchi et al. | 180/220 |
| 2001/0013437 A1 * | 8/2001 | Husted et al. | 180/65.1 |
| 2010/0292877 A1 * | 11/2010 | Lee | 701/21 |
| 2011/0186367 A1 * | 8/2011 | Sagara et al. | 180/65.1 |
| 2013/0161108 A1 * | 6/2013 | Watanabe et al. | 180/220 |
| 2013/0228389 A1 * | 9/2013 | Nakashima et al. | 180/220 |

* cited by examiner

LOW-SLUNG ELECTRIC VEHICLE

CROSS-REFERENCE TO RELAYED APPLICATIONS

The present application claims priority under 35 USC 119 to Japanese Patent Application No. 2012-081512 filed Mar. 30, 2012 the entire contents of which are hereby incorporated by reference.

BACKGROUND OF THE INVENTION

1. Field of the Invention

The present invention relates a low-slung electric vehicle such as an electric scooter driven by an electric motor. More particularly, the invention relates to a low-slung electric vehicle that includes a battery unit as a power supply removably mounted to a vehicle body.

2. Description of Background Art

A low-slung electric vehicle such as an electric scooter is increased in cruising distance if the vehicle carries a battery unit having a high capacity. However, the battery unit is increased in weight to thereby make it difficult to replace the battery unit. In this connection, a technology has been proposed that permits even a high-capacity battery unit to be replaced easily. See, for example, JP Patent No. 3395934.

The low-slung electric vehicle disclosed in JP Patent No. 3395934 has a structure wherein a compartment frame is tiltably assembled to lateral portions of a main frame forward of a seat and the battery unit is mounted on the compartment frame. The battery unit is provided with rolling rollers at front and rear positions on opposite lateral sides thereof. The rolling rollers are adapted to roll on the compartment frame.

In this low-slung electric vehicle, the compartment frame is normally positioned substantially in parallel to a footrest floor so as to retain the battery unit in a horizontal position. In a case where the battery unit is replaced, the compartment frame is tilted and maintained in the tilted position to allow the rolling rollers to roll to permit removing and mounting the battery unit.

In the low-slung electric vehicle of this type, it is important not only to facilitate the operations of removing and mounting the battery unit but also to prevent rattling of the mounted battery unit as well as to prevent the operator from forgetting to disconnect a cable in removing the battery unit.

SUMMARY AND OBJECTS OF THE INVENTION

In this connection, an embodiment of the present invention provides a low-slung electric vehicle that is adapted not only to facilitate the operations of mounting and removing the battery unit but also to prevent the rattling of the mounted battery unit and that is also capable of preventing the operator from forgetting to disconnect the cable in removing the battery unit.

A low-slung electric vehicle according to an embodiment of the present invention adopts the following structures to address the above-described problems.

According to an embodiment of the present invention, a low-slung electric vehicle having a battery unit (BU) removably mounted in a battery compartment (26) of a vehicle body, includes the battery compartment (26) disposed under a seat (3) rearward of a footrest floor (4) and open on a front side. The battery unit (BU) is moved in a fore-aft direction of the vehicle body to be inserted from the footrest floor (4) into the battery compartment (26) or to be removed from the battery compartment (26) and includes an electrode connector (42) to be connected to a feeder connector (41) of the vehicle body. A rolling roller (36a) is mounted to the battery unit (BU) for rolling on a track extending in the battery compartment (26) in the fore-aft direction of the vehicle body. A stopper (44a) is disposed on the track on which the rolling roller (36a) rolls on and restrains the rolling roller (36a) at a predetermined position when the battery unit (BU) is moved to a terminal position in the battery compartment (26). Recessed/projecting fitting portions (37, 46) are disposed between a bottom surface in the battery compartment (26) and close to the footrest floor (4) and a lower side of the battery unit (BU) in corresponding relation to the bottom surface, and are fitted to each other when the rolling roller (36a) is restrained by the stopper (44a). An access gate (27) disposed on an opening side of the battery compartment (26) and openably/closably mounted to a frame member (16) of the vehicle body. Gate restraining means (39) are provided for restraining an operation of opening the access gate (27) after the battery unit (BU) is accommodated in the battery compartment (26). The gate restraining means (39) is made to release the access gate (27) from restraint by an operation of disconnecting the electrode connector (42) from the feeder connector (41).

According to an embodiment of the present invention, a handle portion (38) for an operator to hold is provided at a front end of the battery unit (BU) with respect to the vehicle.

According to an embodiment of the present invention, the gate restraining means includes a connecting cable (39) led out from a main body of the battery unit (BU) and connected to the electrode connector (42). The electrode connector (42) with the connecting cable (39) looped over a part of the access gate (27) is connected to the feeder connector (41).

According to an embodiment of the present invention, the gate restraining means includes a locking mechanism (50) for locking the access gate (27) in a closed state, and a release operation portion (56) for unlocking the locking mechanism (50). In addition, the release operation portion (56) covers an upper surface of a connection portion (51) between the electrode connector (42) and the feeder connector (41) when placed in a position to lock the locking mechanism (50) but exposes the connection portion (51) between the electrode connector (42) and the feeder connector (41) when placed in a position to unlock the locking mechanism (50).

According to an embodiment of the present invention, a luggage box (24) having a top opening openably closed by the seat (3) is disposed under the seat (3), a bottom wall of the luggage box (24) is formed with an access hole (52) facing the release operation portion (56) of the gate restraining means. The unlocking operation occurs by means of the release operation portion (56) and the operation of disconnecting the electrode connector (42) from the connection portion (51) between the electrode connector (42) and the feeder connector (41) that are performed through the access hole (52).

According to an embodiment of the present invention, one of the battery unit (BU) and the battery compartment (26) is provided with a guide rail (43) extending in the fore-aft direction of the vehicle body, while the other one of the battery unit (BU) and the battery compartment (26) is provided with a guide groove (35) slidably engageable with the guide rail (43).

According to an embodiment of the present invention, the guide rail (43) projects upwardly from the floor surface in the battery compartment (26), the rolling roller (36a) rolls on an upper side of the guide rail (43), and the stopper (44a) by which the rolling roller (36a) is restrained is formed in the upper side of the guide rail (43).

According to an embodiment of the present invention, a locking device (30) for locking the access gate (27) in a closed state is provided independently from the gate restraining means (39).

According to an embodiment of the present invention, rear-side restraining means (58) is disposed on the battery compartment (26) at its bottom in a battery-unit insertion direction. The rear-side restraining means restraining the battery unit (BU) as interlocked with a kick-up operation of a main stand (23) of the vehicle and releasing the battery unit (BU) from the restraint in conjunction with the main stand (23) set on the ground.

According to an embodiment of the present invention, the battery unit (BU) is removably mounted in the battery compartment (26) of the vehicle body and includes the battery compartment (26) disposed under the seat to the rear of the footrest floor (4) and open on the front side. The battery unit (BU) is movable in the fore-aft direction of the vehicle body to be inserted from the footrest floor (4) into the battery compartment (26) or to be removed from the battery compartment (26) and that has an electrode connector (142); a feeder connector (141) disposed at the vehicle body and connected to the electrode connector (142) when the battery unit (BU) is mounted to the vehicle; the rolling roller (36a) mounted to the battery unit (BU) for rolling on the track extending in the battery compartment (26) in the fore-aft direction of the vehicle body; the stopper (44a) that is disposed on the track with the rolling roller (36a) rolling and restrains the rolling roller (36a) at the predetermined position when the battery unit (BU) is moved to the terminal position in the battery compartment (26) and the recessed/projecting fitting portions (37, 46) that are disposed between the bottom surface in the battery compartment (26) and close to the footrest floor (4) and the lower side of the battery unit (BU) corresponding to the bottom surface and that are fitted to each other when the rolling roller (36a) is restrained by the stopper (44a). The feeder connector (141) is disposed in the battery compartment (26) at its bottom in the battery-unit insertion direction, while the electrode connector (142) is disposed at an end face of the battery unit (BU) on a side that is first inserted into the battery compartment (26). The electrode connector (142) is connected to the feeder connector (141) when the battery unit (BU) is moved to the terminal position in the battery compartment (26).

According to an embodiment of the present invention, the rolling roller of the battery unit rollably moves in the battery compartment thereby facilitating the insertion of the battery unit into the battery compartment and the removal of the battery unit from the battery compartment. Further, when the battery unit is moved to the terminal position in the battery compartment during mounting of the battery unit, the rolling roller is restrained by the stopper and the recessed/projecting fitting portions are fitted to each other. Thus, the operator can be informed of the completion of mounting of the battery unit. More specifically, the rattling of the mounted battery unit can be suppressed by the recessed/projecting fitting portions.

Further according to an embodiment of the invention, the recessed/projecting fitting portions are provided between the bottom surface in the battery compartment and close to the footrest floor and the lower side of the battery unit corresponding to the bottom surface. Therefore, when the battery unit is removed, the recessed/projecting fitting portions can be easily released from the fitting by temporarily lifting up the front end of the battery unit with respect to the vehicle body.

Further according to an embodiment of the invention, the access gate is closed after the battery unit is accommodated in the battery compartment. Thus, the operation of opening the access gate is inhibited by the gate restraining means. Therefore, the access gate can restrain an accidental displacement of the battery unit in a forward direction of the vehicle body.

Further according to an embodiment of the invention, in the removal of the battery unit from the battery compartment, the operator disconnects the electrode connector from the feeder connector so as to release the access gate from the restraint by the gate restraining means. In this state, the operator opens the access gate and removes the battery unit. It is therefore ensured that the operator is positively prevented from proceeding to remove the battery unit while forgetting to disconnect the electrode connector from the feeder connector.

According to an embodiment of the present invention, when removing the battery unit, the operator can easily release the recessed/projecting fitting portions from the fitting by holding the handle portion to lift up the battery unit.

According to an embodiment of the present invention, the electrode connector with the connecting cable looped over a part of the access gate is connected to the feeder connector in a state where the battery unit is accommodated in the battery compartment and the access gate is closed. Thus, the operator is prevented from proceeding to open the access gate and remove the battery unit before disconnecting the electrode connector from the feeder connector.

According to an embodiment of the present invention, when the operator manipulates the release operation portion for the locking mechanism in order to extract the electrode connector from the feeder connector, the locking mechanism is unlocked to enable the operation of opening the access gate. Further, according to an embodiment of the invention, when the operator manipulates the release operation portion for the locking mechanism to unlock the locking mechanism in order to open the access gate, the connection portion between the electrode connector and the feeder connector having been covered by the operation portion is exposed so as to prompt the operator to disconnect the electrode connector from the feeder connector.

According to an embodiment of the present invention, the battery unit can be stably moved in the fore-aft direction of the vehicle body by virtue of the engagement between the guide rail and the guide groove. This always ensures stable operation of the battery unit and stable engagement of the recessed/projecting fitting portions.

According to an embodiment of the present invention, the stopper is formed in an upper side of the guide rail projecting upwardly from the floor surface of the battery compartment. It is therefore easy to machine the stopper.

According to an embodiment of the present invention, the locking device for locking the access gate in the closed state is provided independently from the gate restraining means. Thus, the access gate can be more firmly fixed and locked.

According to an embodiment of the present invention, the rear-side restraining means restrains the battery unit when the operator kicks up the main stand and starts riding the vehicle. Thus, the battery unit can be assuredly prevented from rattling during operation. Further according to an embodiment of the invention, the battery unit is released from the restraint by the rear-side restraining means when the main stand is set on the ground for replacement of the battery unit. Thus the removal of the battery unit from the battery compartment is permitted.

According to an embodiment of the present invention, the rolling roller of the battery unit rolls in the battery compartment thereby facilitating the insertion of the battery unit into the battery compartment and the removal of the battery unit from the battery compartment. Further, when the battery unit is moved to the terminal position in the battery compartment during mounting of the battery unit, the rolling roller is restrained by the stopper and the recessed/projecting fitting portions are fitted to each other. Thus, the operator can be informed of the completion of mounting of the battery unit. More specifically, the rattling of the mounted battery unit can be suppressed by the recessed/projecting fitting portions.

Further according to an embodiment of the invention, the recessed/projecting fitting portions are disposed between the bottom surface in the battery compartment and close to the footrest floor and the corresponding lower side of the battery unit. Therefore, the recessed/projecting fitting portions can be released from the fitting by temporarily lifting up the front end of the battery unit during the removal of the battery unit.

Further according to an embodiment of the invention, the structure is made such that the feeder connector is disposed in the battery compartment at its bottom in the battery-unit insertion direction, while the electrode connector is disposed at the battery unit at an end face on its side that is first inserted in the battery compartment, and such that the electrode connector is connected to the feeder connector when the battery unit is moved to the terminal position in the battery compartment. This not only provides simplified wiring structure but also facilitates the operations of mounting and removing the battery unit. Further according to an embodiment of the invention, the removal of the electrode connector from the feeder connector is completed concurrently with the extraction of the battery unit during the removal of the battery unit. Thus, the connection portion between the connectors and the wirings are not subjected to large load.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a side view showing a rear vehicle body of the low-slung electric vehicle according to the first embodiment of the invention, the rear vehicle body removed of a cover and the like;

FIG. 4 is a perspective view showing the rear vehicle body of the low-slung electric vehicle according to the first embodiment of the invention, the rear vehicle body removed of the cover and the like;

DETAILED DESCRIPTION OF THE PREFERRED EMBODIMENTS

Figure 1:
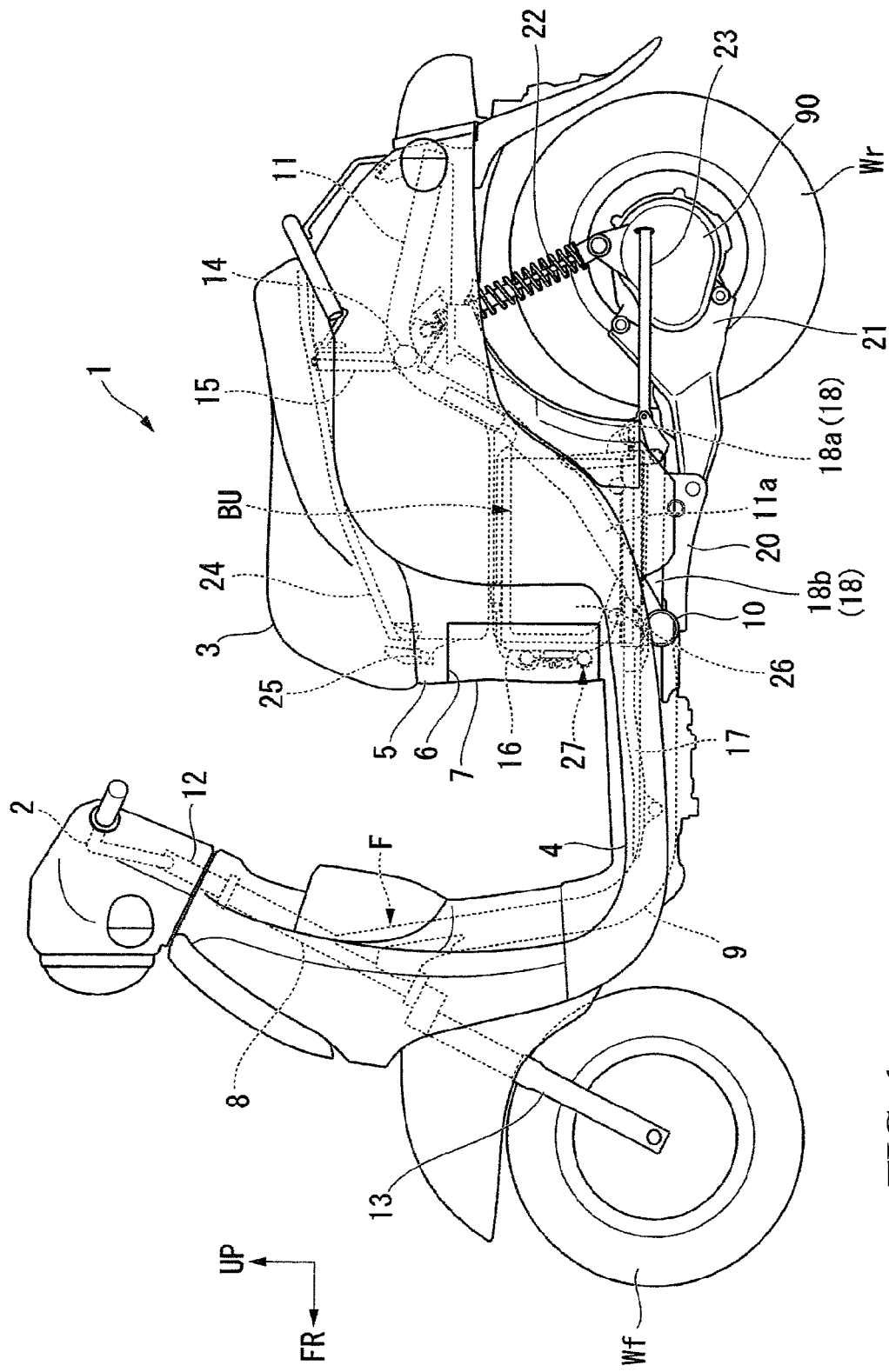
FIG. 1 is a side view showing a low-slung electric vehicle according to a first embodiment of the invention.

The embodiments of the invention will be described as below with reference to the accompanying drawings. In the following description, forward direction, rearward direction, right direction, left direction and the like coincide with the forward, rearward, right and left directions of a vehicle unless otherwise stated. Further, an arrow FR in the drawings denotes a front side of the vehicle, an arrow UP denotes an upper side of the vehicle, an arrow LH denotes a left-hand side of the vehicle.

First, a first embodiment shown in FIG. 1 to FIG. 12 is described.

FIG. 1 is a side view showing the whole body of a vehicle of this embodiment.

The vehicle of this embodiment is a scooter-type two-wheeled electric vehicle 1 which represents one mode of a low-slung electric vehicle. The two-wheeled electric vehicle 1 is provided with a footrest floor 4 for an occupant's feet to rest on between a steering handlebar 2 and an occupant seat 3. The two-wheeled electric vehicle 1 has a rear wheel Wr driven by an electric motor 90. This two-wheeled electric vehicle 1 further includes a suspension system for a front wheel Wf and a suspension system for the rear wheel Wr which are supported forwardly and rearwardly of a body frame F, respectively. Further, the seat 3 is supported at an upper part substantially centrally of the body frame F in a fore-aft direction.

In this two-wheeled electric vehicle 1, a battery unit BU as a power supply of the vehicle is disposed in space under the seat 3 rearward of the footrest floor 4.

Figure 2:
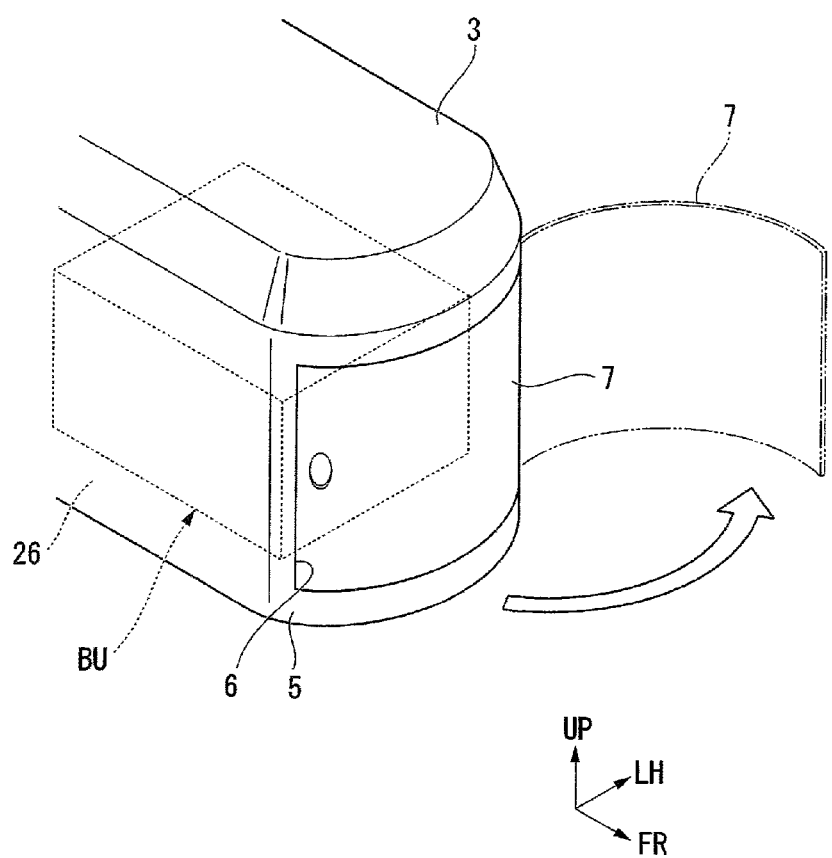
FIG. 2 is a perspective view showing a portion under a sheet of the low-slung electric vehicle according to the first embodiment of the invention.

FIG. 2 is a view of a rear portion of the footrest floor 4 of the vehicle as seen from diagonally forward above.

As shown in the drawing, a region under the seat 3 rearward of the footrest floor 4 is covered by a resin cover member 5. A front side of the cover member 5 is provided with an opening 6 through which the battery unit BU is inserted in the region from the footrest floor 4 or removed from the region. The opening 6 is covered by an openable and closable door member 7.

Figure 3:
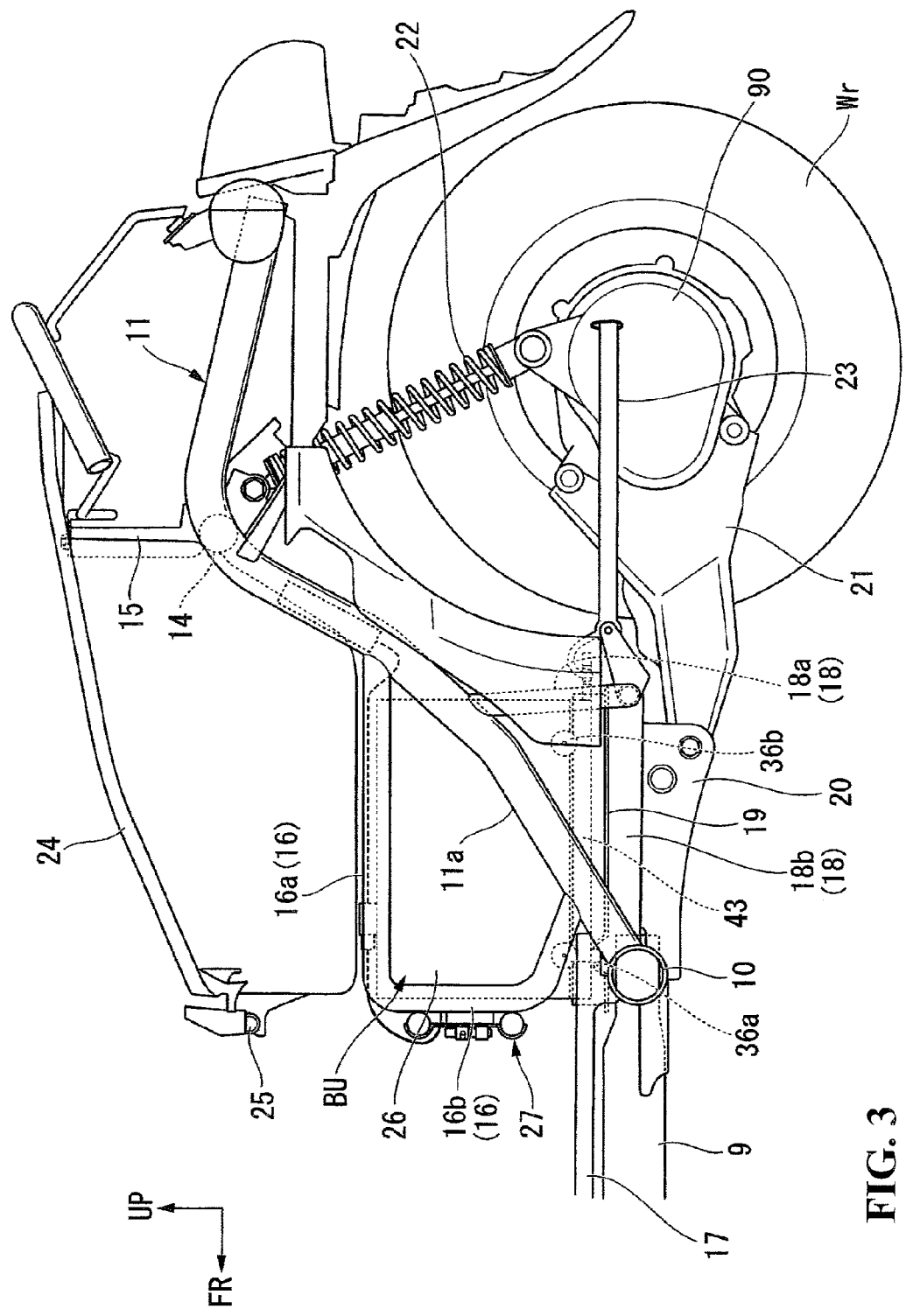
Figure 4:
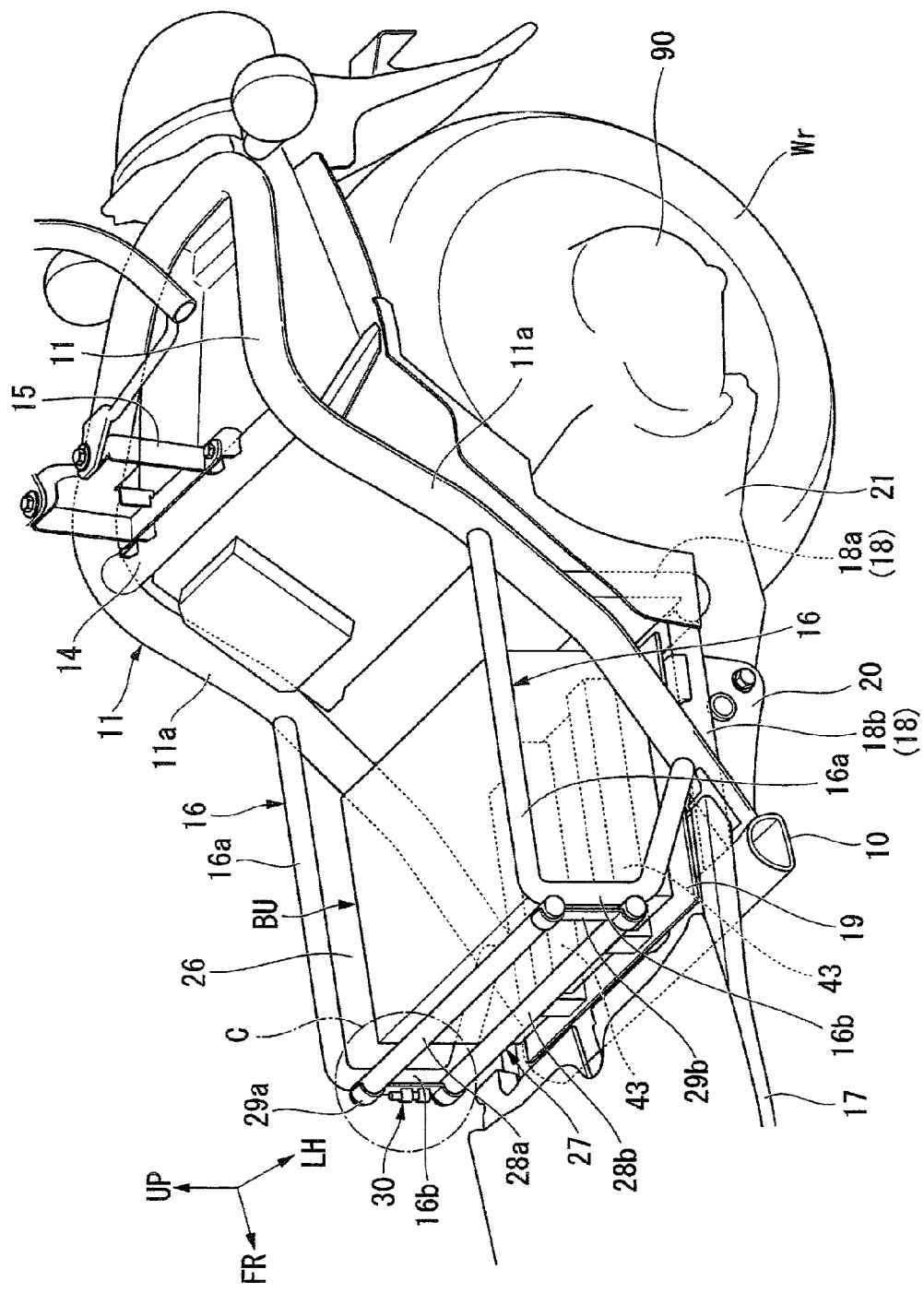

FIG. 3 and FIG. 4 are diagrams showing the two-wheeled electric vehicle 1 from which the outside cover member 5 and some components are removed as needed.

As shown in FIG. 1 and these drawings, the body frame F as a main frame of a vehicle body includes a main frame 9 a front end of which is connected to a head pipe 8 (see FIG. 1); a lower cross pipe 10 disposed substantially centrally of the vehicle in the fore-aft direction thereof and perpendicularly connected to a rear end portion of the main frame 9 and a pair of right and left rear frames 11, front ends of which are connected to right and left ends of the lower cross pipe 10 in a width direction of the vehicle.

The main frame 9 is inclined rearwardly and downwardly from the head pipe 8 and then substantially horizontally extends rearwardly. The rear end portion of the main frame 9 is located substantially beneath a front end of the seat 3 and is connected to the lower cross pipe 10.

As shown in FIG. 1, a handlebar stem 12 is rotatably retained by the head pipe 8 connected to the main frame 9. The above-described handlebar 2 is connected to an upper end of the handlebar stem 12. The handlebar 2 is coupled to a front fork 13 supporting the front wheel Wf.

The right and left rear frames 11 extend diagonally upwardly and rearwardly from a connection portion with the lower cross pipe 10 toward the vicinity of a rear end portion of the seat 3. Further, the right and left rear frames 11 define a rear zone that is inclined slightly downwardly and extends to the vicinity of a rear end of the vehicle. The right and left rear frames 11 have their rear ends connected to each other at the rear end of the vehicle.

It is assumed here that a portion of the right/left rear frame 11 that extends diagonally upwardly and rearwardly from the lower cross pipe 10 is referred to as a "tilted frame portion 11a." The right and left rear frames 11 are interconnected by means of an upper cross pipe 14 in the vicinity of the upper ends of the tilted frame portions 11a. Projecting upwardly from an upper part of the upper cross pipe 14 is a seat supporting bracket 15 also serving as a mounting seat for an unillustrated seat lock mechanism.

Each of the tilted frame portions 11a of the right and left rear frames 11 is assembled with a frame pipe 16 substantially bent in an L-shape. Each of the frame pipes 16 includes a fore-aft support portion 16a extending substantially horizontally from an upper region of the tilted frame portion 11a toward the front of the vehicle body and a vertical strut portion 16b extending vertically downwardly from a front end of the fore-aft support portion 16a.

As shown in FIG. 3 and FIG. 4, a floor supporting sub-frame 17 supporting the footrest floor 4 from below is connected to each of the front portions of the right and left rear frames 11. Further, a battery supporting sub-frame 18 for placing the battery unit BU thereon is disposed rearwardly of the lower cross pipe 10.

The battery supporting sub-frame 18 includes a rear frame portion 18a formed of a substantially U-shaped pipe member and a pair of side flame portions 18b formed of a straight pipe member.

The rear frame portion 18a is arranged in a manner such that an extension region at the center (hereinafter, referred to as "central extension region") is oriented in the width direction of the vehicle and that bent regions on both sides of the extension region extend upwardly and are connected to the tilted frame portions 11a of the right and left rear frames 11 at respective ends thereof.

The side frame portions 18b are disposed inwardly of the right and left rear frames 11 (the tilted frame portions 11a) in the width direction of the vehicle and connected to the lower cross pipe 10 and the central extension region of the rear frame portion 18a. Both the side frame portions 18b are disposed in a parallel relation, extending in the fore-aft direction of the vehicle. A metallic floor plate 19 is mounted to respective upper sides of the side frame portions 18b. Furthermore, a front edge portion of the floor plate 19 also rests on an upper side of the lower cross pipe 10. The battery unit BU is placed on an upper side of the floor plate 19 supported by the sub-frame 18 and the lower cross pipe 10 in this manner.

The right and left side frame portions 18b of the battery supporting sub-frame 18 are each mounted with a pivot plate 20. These pivot plates 20 each swingably support a front end of a swing arm 21. The rear wheel Wr is pivotally supported by rear ends of the swing arms 21. Further, the swing aims 21 also retain the electric motor 90 (including reduction gears) for driving the rear wheel Wr, an unillustrated brake mechanism and the like. The rear ends of the swing arms 21 are also supported by upper ends of the tilted frame portions 11a of the rear frames 11 via shock absorbers 22. In this embodiment, the electric motor 90 is disposed on one of the swing arms 21 that is on the left side of the rear wheel Wr.

A main stand 23 to be described hereinlater is rotatably mounted to the rear frame portion 18a of the battery supporting sub-fume 18 via an unillustrated bracket.

In addition, as shown in FIG. 1, a luggage box 24 for accommodating a helmet, small articles and the like is disposed under the seat 3 for an occupant to be seated thereon. The luggage box 24 is formed from a hard resin material and into a box-like shape open on the top. The top opening of the luggage box 24 is openably closed by the seat 3. In FIG. 1 an open/close hinge 25 is provided for rotatably supporting the front end of the seat 3 on a front end of the luggage box 24. The luggage box 24 is assembled to the fore-aft support portions 16a of the right and left frame pipes 16 and the seat supporting bracket 15.

A space under the luggage box 24 and enclosed by the right and left frame pipes 16 and the floor plate 19 on the sub-frame 18 defines a battery compartment 26 wherein the battery unit BU is accommodated. The battery compartment 26 is closed on a rear side with respect to the vehicle body by means of unillustrated frame member and plate member, and has an openable front side.

More specifically, an access gate 27 is mounted in between the vertical strut portions 16b of the right and left flame pipes 16. The front side of the battery compartment 26 is opened by opening the access gate 27. The access gate 27 includes a pair of upper and lower transverse beam pipes 28a, 28b. Respective pairs of right and left ends of the transverse beam pipes 28a, 28b are interconnected by coupling plates 29a, 29b. One end of the access gate 27 in the width direction of the vehicle is rotatably mounted to the vertical strut portion 16b of one of the frame pipes 16 (the left-hand one in the width direction of the vehicle) by means of an unillustrated hinge. The other end of the access gate 27 in the width direction of the vehicle can be locked to the vertical strut portion 16*b* of the other one of the frame pipes 16 (the right-hand one in the width direction of the vehicle) by means of a locking device 30.

Figure 5:
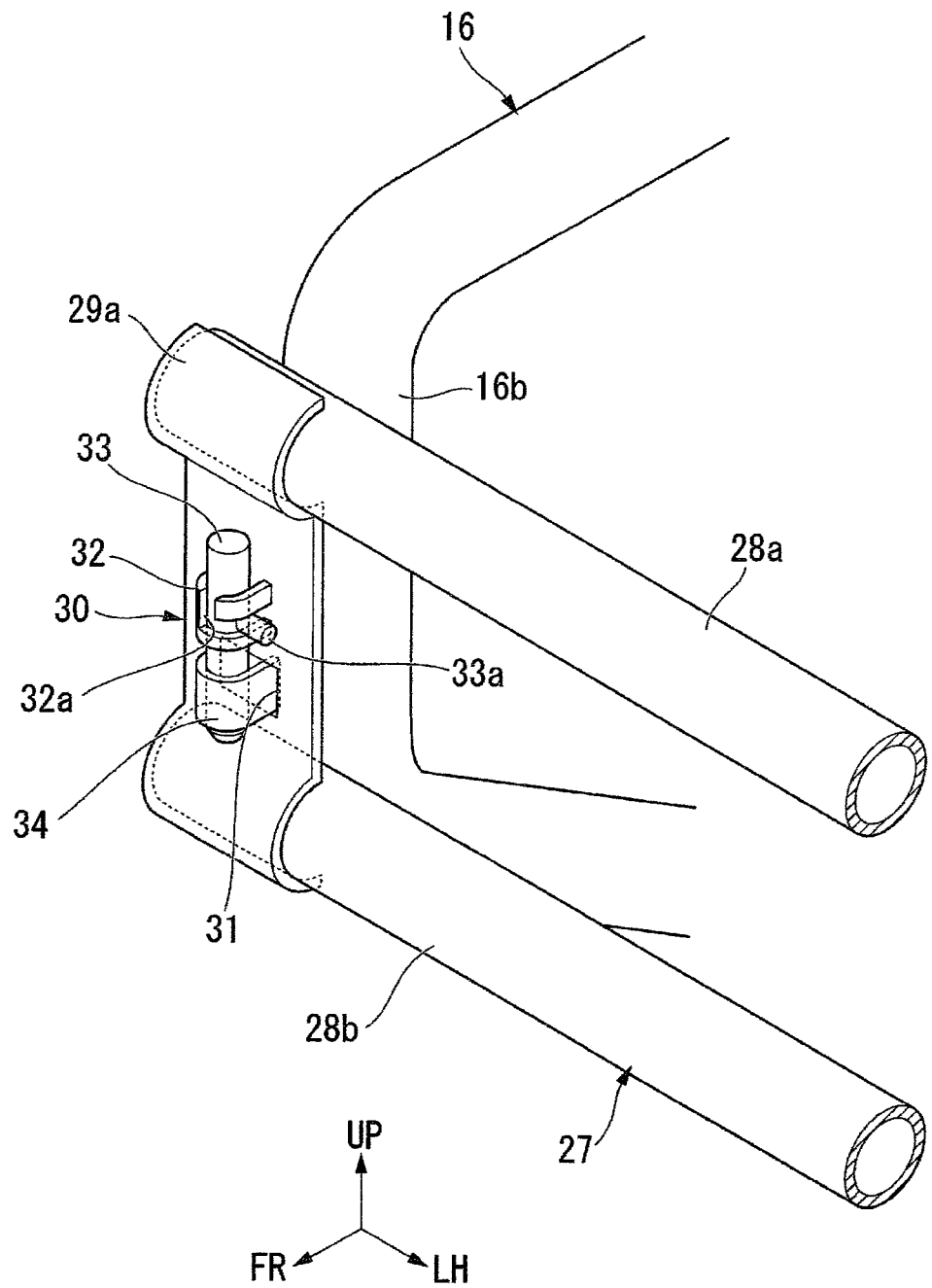
FIG. 5 is an enlarged view showing a portion C in FIG. 4 of the low-slung electric vehicle according to the first embodiment of the invention.

FIG. 5 is a diagram showing the locking device 30 in an enlarged dimension.

As shown in the drawing, the locking device 30 includes an aperture 31 formed in the coupling plate 29*a*; a guide cylinder 32 projecting from a front side of the coupling plate 29*a*; a lock pin 33 retractably retained in the guide cylinder 32 and a receiving cylinder 34 projecting from a front side of the vertical strut portion 16*b* of the frame pipe 16 and inserted in the aperture 31 in the coupling plate 29*a*. The locking device 30 locks up the access gate 27 when the access gate 27 is closed to allow the receiving cylinder 34 to project forward through the aperture 31 in the coupling plate 29*a* and the lock pin 33 is fitted in the receiving cylinder 34. A manipulating lug 33*a* projects from an outer periphery of the lock pin. A guide groove 32*a* is formed on the guide cylinder 32 to be engaged with the manipulating lug 33*a*.

Figure 6:
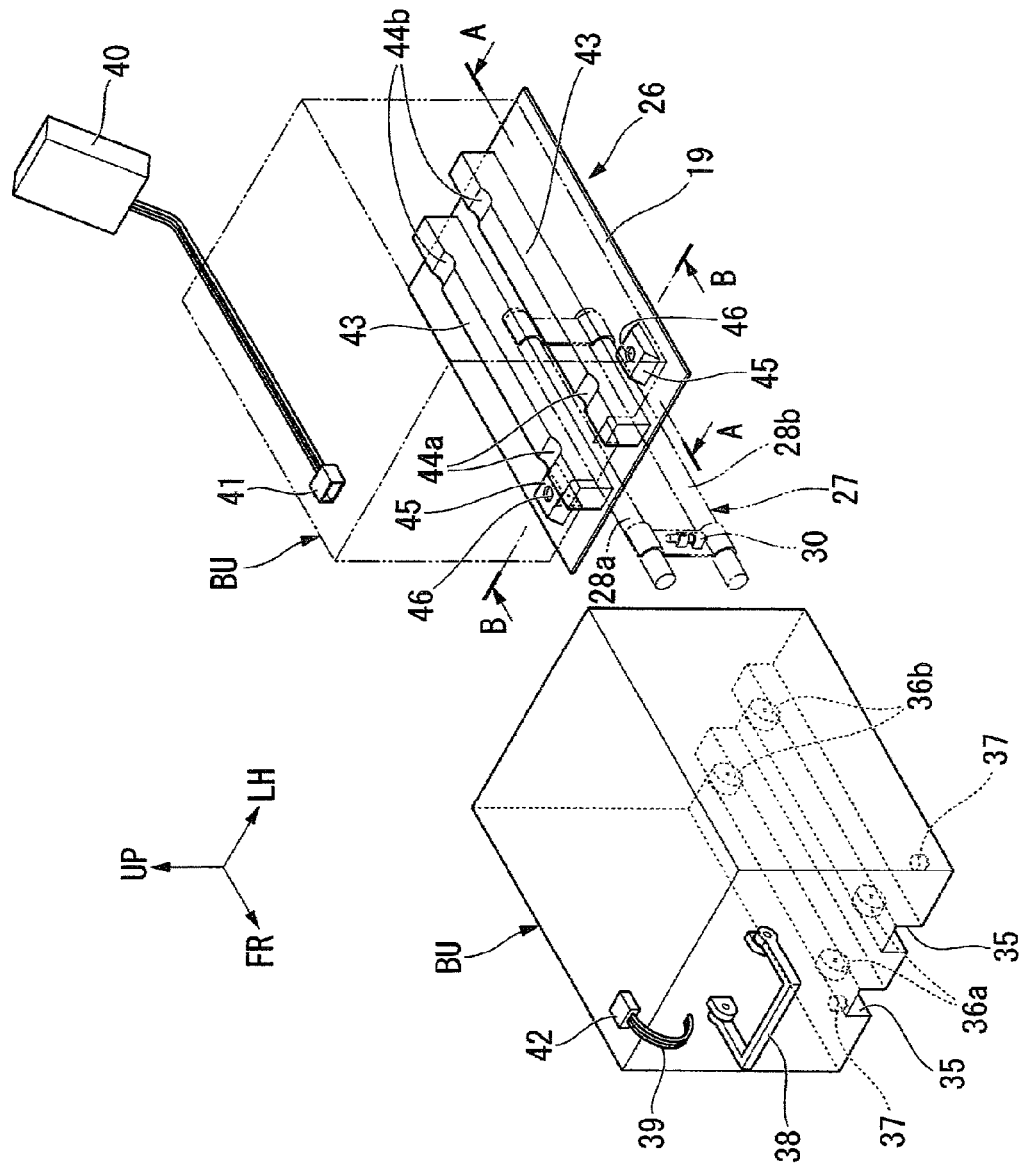
FIG. 6 is a perspective view showing a battery unit and a battery compartment of the low-slung electric vehicle according to the first embodiment of the invention.

FIG. 6 is a diagram showing the battery unit BU and a bottom wall of the battery compartment 26.

The battery unit BU, the details of which are not shown in this drawing, includes a plurality of battery modules accommodated in a resin battery box.

The battery unit BU is formed in a rectangular parallelepiped elongated in the fore-aft direction. The battery unit BU is formed with a pair of guide grooves 35 on a lower side thereof. The guide grooves 35 extend in the fore-aft direction of the vehicle body. Rollers 36*a*, 36*b* are disposed at a front region and a rear region in each of the guide grooves 35. The rolling rollers 36*a*, 36*b* are each rotatably supported by the battery unit BU and have a partial lower part thereof projecting downwardly from an upper wall of the corresponding guide groove 35. The battery unit BU has a pair of engaging projections 37 projecting downwardly from the lower side thereof Both the engaging projections 37 are disposed outwardly of the rolling rollers 36*a* at the front region in the width direction of the vehicle.

A handle portion 38 to be held by an operator is provided generally centrally of a front side of the battery unit BU. In the case of this embodiment, the handle portion 38 is rotatably mounted to the front side of the battery unit BU but is adapted to retain the angle thereof as placed in horizontal position.

A connecting cable 39 for power supply to the vehicle body is led out from the front side of the battery unit BU. An electrode connector 42 is connected with an end of the connecting cable 39 led out. The electrode connector 42 is adapted for a removable fitting connection with a feeder connector 41 of a power controller 40 of the vehicle body (including a PDU (Power Drive Unit) controlling current distributed to the electric motor 90). The power controller 40 is disposed at a place to the rear and upward of the battery compartment 26 and fixed to the rear frame 11 or the like. The feeder connector 41 is disposed at place forward and upward of the battery compartment 26 and fixed to the frame pipe 16 via an illustrated bracket.

On the other hand, a pair of guide rails 43 is mounted to the upper side of the floor plate 19 defining the bottom wall of the battery compartment 26 and extends in the fore-aft direction of the vehicle body. The guide rails 43 are formed to have a substantially rectangular cross-sectional shape and are adapted to make a slidable engagement with the guide grooves 35 in the lower side of the battery unit BU when the battery unit BU is accommodated in the battery compartment 26.

It is noted that the rolling rollers 36*a*, 36*b* of the battery unit BU come into contact with the upper sides of the guide rails 43 so as to roll on the guide rails 43 during the insertion or extraction of the battery unit BU.

Figure 7:
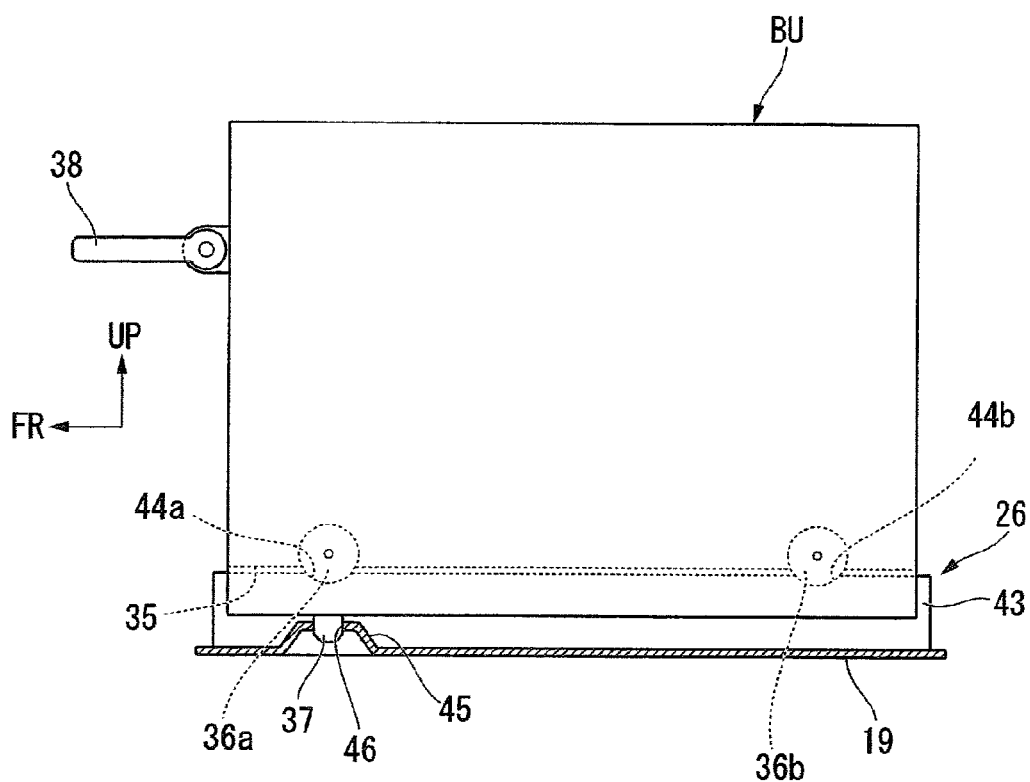
FIG. 7 is a sectional view of the low-slung electric vehicle according to the first embodiment of the invention taken on line A-A in FIG. 6.
Figure 8:
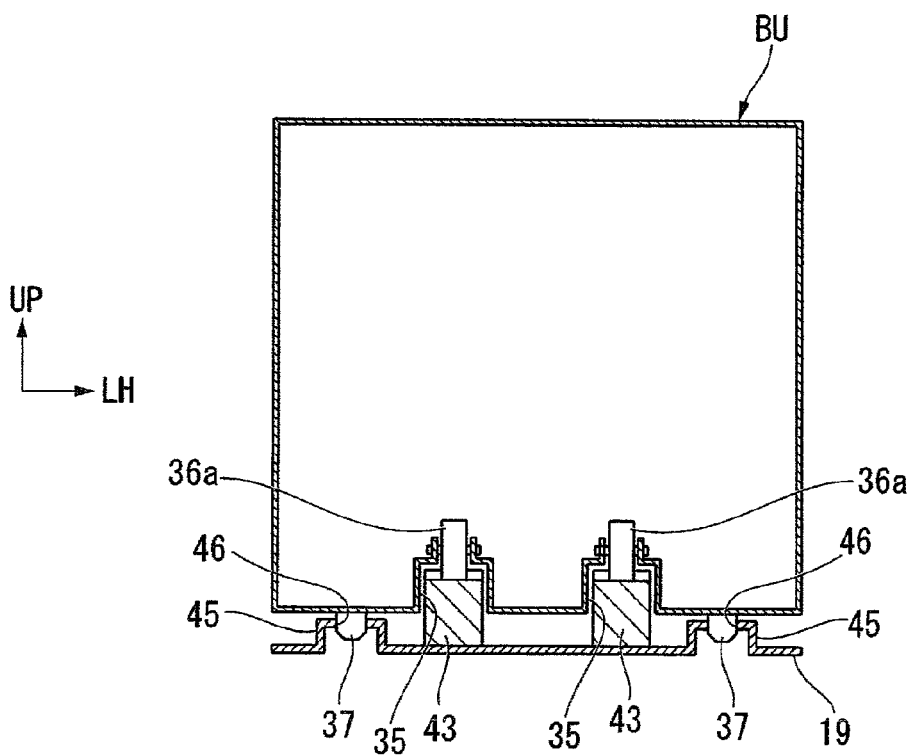
FIG. 8 is a sectional view of the low-slung electric vehicle according to the first embodiment of the invention taken on line B-B in FIG. 6.

FIG. 7 and FIG. 8 are diagrams showing cross sections of the battery unit BU accommodated in the battery compartment 26 taken on the line A-A and the line B-B in FIG. 6, respectively.

As also shown in these drawings, the upper side of each guide rail 43 on which the rolling rollers 36*a*, 36*b* roll is formed with arcuate recesses 44*a*, 44*b* (stoppers) for the front and rear rolling rollers 36*a*, 36*b* to drop into when the battery unit BU is moved from the front side to a terminal position in the battery compartment 26. On the other hand, bumps 45 are provided on the floor plate 19 at places outwardly of the front recesses 44*a* in the width direction of the vehicle. A top surface of each bump 45 is formed with an engagement hole 46 wherein the engaging projection 37 of the battery unit BU is fittably received. Each engagement hole 46 is adapted for fittably receiving the corresponding engaging projection 37 therein when the battery unit BU is moved to the terminal position in the battery compartment 26 to thereby allow the rolling rollers 36*a*, 36*b* to drop into the corresponding recesses 44*a*, 44*b*.

In this embodiment, the engaging projection 37 of the battery unit BU and the engagement hole 46 of the floor plate 19 constitute recessed/projecting fitting portions.

Figure 9:
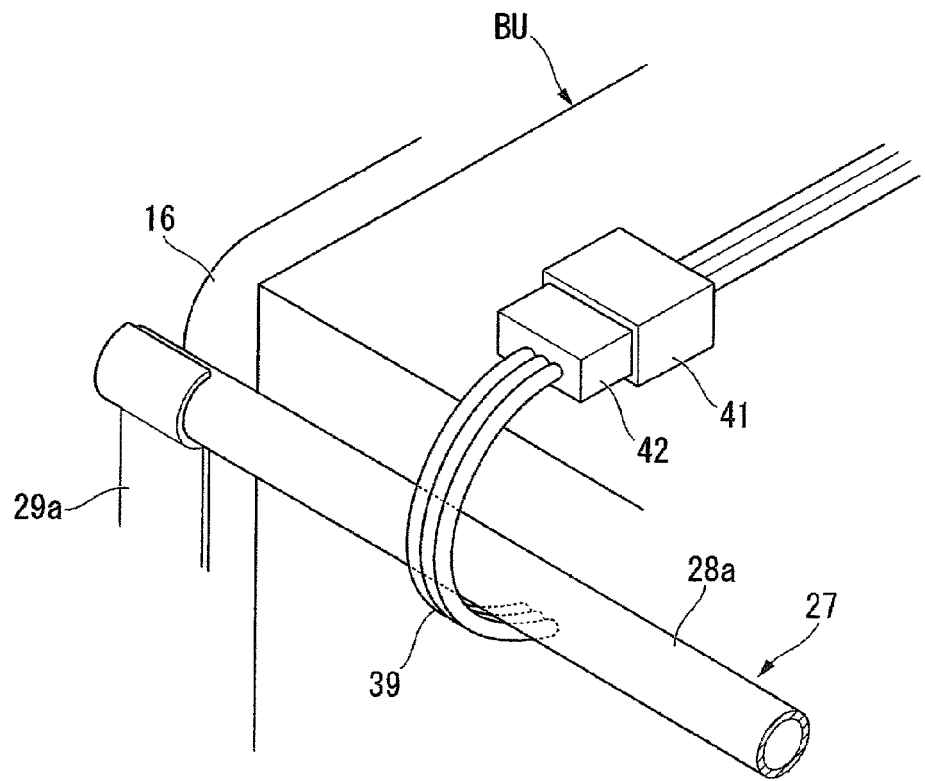
FIG. 9 is an enlarged view showing a connector connection portion of the low-slung electric vehicle according to the first embodiment of the invention.
Figure 9:
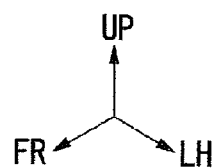

FIG. 9 is a diagram showing the wire connection of the battery unit BU mounted in the vehicle body.

As shown in the drawing, the front side of the battery compartment 26 is closed by the access gate 27 after the battery unit BU is inserted into the battery compartment 26 of the vehicle body. In this state, the electrode connector 42 of the battery unit BU is fitted and connected to the feeder connector 41 of the vehicle body (the power controller 40). At this time, the electrode connector 42 of the battery unit BU together with the connecting cable 39 is led out of the access gate 27 through space under the upper transverse beam pipe 28*a* of the access gate 27. In this state, the connecting cable 39 is looped over an outer side of the transverse beam pipe 28*a* and the electrode connector 42 is connected to the feeder connector 41. As described above, the feeder connector 41 is fixed to the frame pipe 16 via the bracket. Therefore, when the electrode connector 42 is connected to the feeder connector 41, the operation of the opening of the access gate 27 is restrained by the connecting cable 39.

According to this embodiment, the connecting cable 39, looped over the transverse beam pipe 28*a* of the access gate 27 when the electrode connector 42, is connected to the feeder connector 41 and constitutes the gate restraining means.

The operation of mounting and removing the battery unit BU to and from this two-wheeled electric vehicle 1 will be described as below with reference to FIGS. 10(A) to 10(C) and FIG. 11.

To mount the battery unit BU in the battery compartment 26 of the vehicle, the operator may open the door member 7 under the front portion of the seat 3 and access the access gate 27 via the opening 6 of the cover member 5 so as to push open the access gate 27.

Figure 10A:
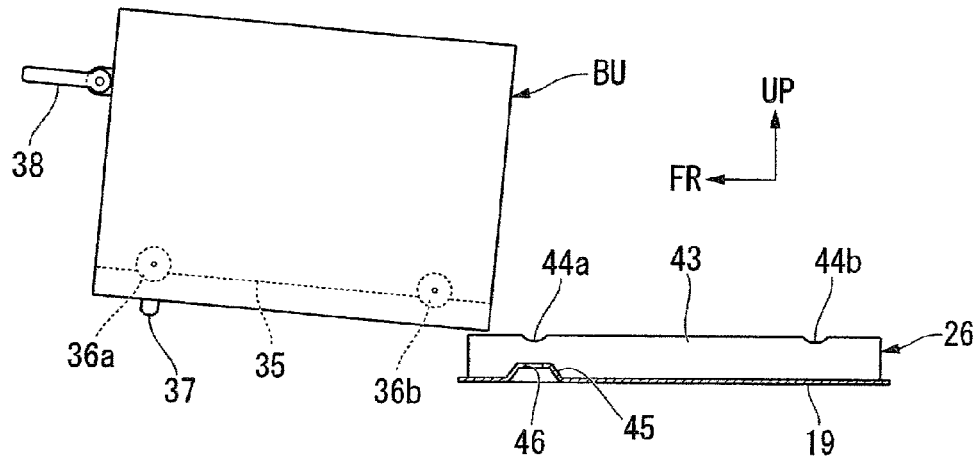
FIGS. 10(A) to 10(C) are a group of sectional views resemblant to FIG. 7, which show the steps of mounting the battery unit of the low-slung electric vehicle according to the first embodiment of the invention in the order of 10(A) to 10(C)
Figure 10B:
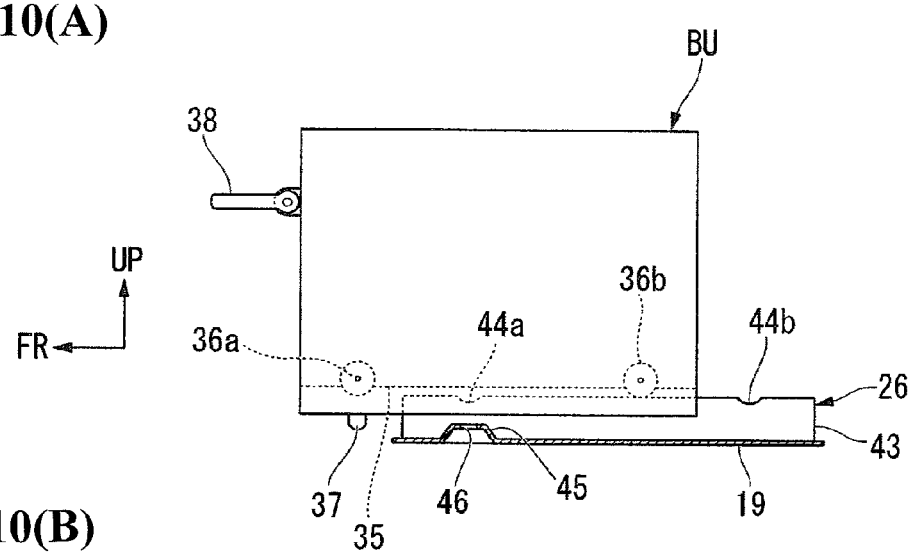

Subsequently in this state, the operator inserts a lower end of a rear portion of the battery unit BU into the battery compartment 26 and holds the handle portion 38 to insert the battery unit BU in the battery compartment 27 while allowing the right and left guide grooves 35 of the battery unit BU to engage with the corresponding guide rails 43 of the vehicle body, as shown in FIG. 10(A) and FIG. 10(B). This insertion of the battery unit BU in the battery compartment 26 allows the rolling rollers 36a, 36b of the battery unit BU to roll on the upper sides of the guide rails 43 while allowing the sidewalls of the guide grooves 35 to make a sliding contact with the guide rails 43. As a result, the battery unit BU is smoothly moved into the battery compartment 26 as guided by the guide rails 43.

Figure 10C:
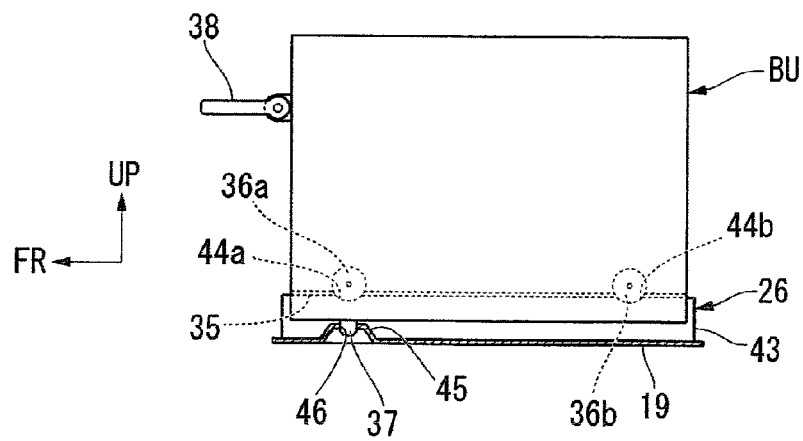

In conjunction with the battery unit BU thus moved to the terminal position in the battery compartment 26, the front and rear rolling rollers 36a, 36b of the battery unit BU drop into the corresponding recesses 44a, 44b on the guide rails 43, as shown in FIG. 10(C). Thus, the whole body of the battery unit BU is displaced downwardly, so that the engaging projections 37 on the lower side of the front portion of the battery unit BU are fittably received in the corresponding engagement holes 46 on the floor plate 19.

As a result, the battery unit BU is exactly positioned at and fixed to a predetermined position in the battery compartment 26. In addition, the rattling of the battery unit BU in the battery compartment 26 is suppressed.

Subsequently, the operator may close the access gate 27 and lock the access gate 27 by means of the locking device 30. Then, the operator may take out the connecting cable 39 of the electrode connector 42 through space under the transverse beam pipe 28a of the access gate 27 and loop the connecting cable 39 over a front side of the transverse beam pipe 28a so as to fit and connect the electrode connector 42 to the feeder connector 41. Lastly, the operator may close the door member 7 to complete the operation.

To remove the battery unit BU from the battery compartment 26 of the vehicle, on the other hand, the operator may open the door member 7 similarly to the above-described procedure and disconnect the electrode connector 42 of the battery unit BU from the feeder connector 41. Thus, the access gate 27 having been restrained by the connecting cable 39 is released. Subsequently, the operator may unlock the locking device 30, before pushing open the access gate 27.

Figure 11:
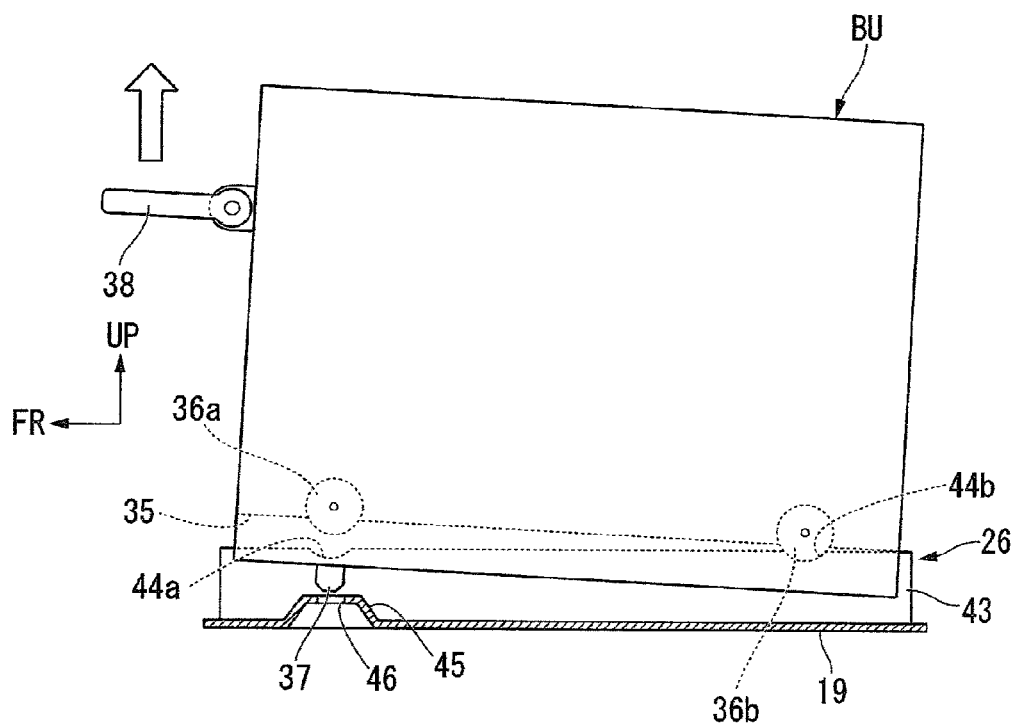
FIG. 11 is a sectional view resemblant to FIG. 7, which shows a behavior of the battery unit of the low-slung electric vehicle according to the first embodiment of the invention when the battery unit is removed.
Figure 12:
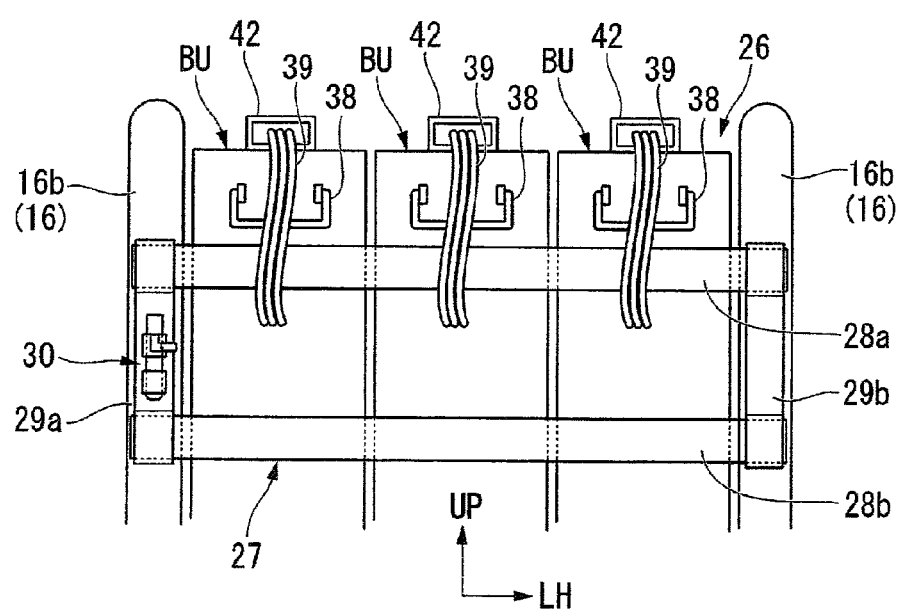
FIG. 12 is a front view showing an exemplary modification of the battery compartment of the low-slung electric vehicle according to the first embodiment of the invention.

Next, the operator may hold the handle portion 38 at a front end of the battery unit BU in this state, lifting up the front end of the battery unit BU together with the handle portion 38 by a predetermined amount as shown in FIG. 11. Keeping the battery unit BU in this state, the operator may pull forward the battery unit BU out of the battery compartment. At this time when the front end of the battery unit BU is lifted up by a predetermined amount, the front rolling rollers 36a are pulled out of the corresponding recesses 44a while simultaneously the engaging projections 37 of the battery unit BU are pulled out of the engagement holes 46 on the floor plate 19. Subsequently when the battery unit BU is pulled forward, therefore, the rear rolling rollers 36b are pulled out of the corresponding recesses 44b, allowing the rolling rollers 36a to roll smoothly on the guide rails 43 from then on.

The battery unit BU is extracted from the battery compartment 26 in this manner.

As described above, the two-wheeled electric vehicle 1 of this embodiment facilitates the operations of mounting and removing the battery unit BU because the rolling rollers 36a, 36b mounted to the battery unit BU roll on the guide rails 43 for mounting the battery unit BU to the battery compartment 26 or removing the battery unit BU from the battery compartment 26.

In this two-wheeled electric vehicle 1, when the battery unit BU is moved to the terminal position by rollably moving the rolling rollers 36a, 36b for mounting the battery unit BU, the individual rolling rollers 36a, 36b drop into the corresponding recesses 44a, 44b to allow the engaging projections 37 on the lower side of the battery unit BU to be fittably received in the engagement holes 46 on the floor plate 19. Thus, the two-wheeled electric vehicle 1 can inform the operator of the completion of operation of mounting the battery unit BU. In addition, this two-wheeled electric vehicle 1 can prevent the rattling of the battery unit BU thus mounted.

In this two-wheeled electric vehicle 1, the engaging projections 37 are disposed on the lower side of the front portion of the battery unit BU while the corresponding engagement holes 46 are disposed at a front end portion of the floor plate 19. In the removal of the battery unit BU, therefore, the engaging projections 37 can be easily extracted from the engagement holes 46 by pulling out the battery unit BU by lifting up the front end of the battery unit BU. Thus, the operation of removing the battery unit BU is facilitated.

More particularly, in the case of this embodiment, the handle portion 38 is provided at the front end of the battery unit BU. Thus, the operator can easily lift up a front end of the battery unit BU and pull out the battery unit BU by holding this handle portion.

Further, in this two-wheeled electric vehicle 1, the front side of the battery compartment 26 is closed by the access gate 27 and the access gate 27 is locked after the battery unit BU is mounted in the battery compartment 26. Thus, the access gate 27 can reliably restrict an accidental forward displacement of the battery unit BU while the vehicle is being operated.

Further in this two-wheeled electric vehicle 1, the electrode connector 42, with the connecting cable 39 looped over the front side of the transverse beam pipe 28a of the access gate 27, is connected to the feeder connector 41 of the vehicle body after the access gate 27 is closed. Therefore, the operation of opening the access gate 27 can be restrained until the electrode connector 42 is disconnected from the feeder connector 41. This means that the access gate 27 cannot be opened unless the electrode connector 42 is removed from the feeder connector 41. Thus, the operator is assuredly prevented from forcibly removing the battery unit BU while forgetting to remove the electrode connector 42 from the feeder connector 41.

Further in this embodiment, the guide rails 43 project upwardly from the floor plate 19 and extend thereon in the fore-aft direction of the vehicle body, while the guide grooves 35 in engageable relation with the guide rails 43 are formed in the lower side of the battery unit BU. This is effective to stabilize the motion of the battery unit BU during the mounting or removal of the battery unit BU. In addition, this ensures stable and reliable fitting of the engaging projections 37 and the engagement holes 46.

Further in this embodiment, the recesses 44a, 44b allowing the rolling rollers 36a, 36b of the battery unit BU to drop therein are formed in the upper sides of the guide rails 43 projected upwardly from the floor plate 19. This is advantageous in that it is easy to machine the recesses 44a, 44b.

According to the above examples, the battery unit BU as a single entity is mounted in the battery compartment 26. As illustrated by an exemplary modification shown in FIG. 12, a plurality of battery units BU may be mounted in parallel in the battery compartment 26.

Figure 13:
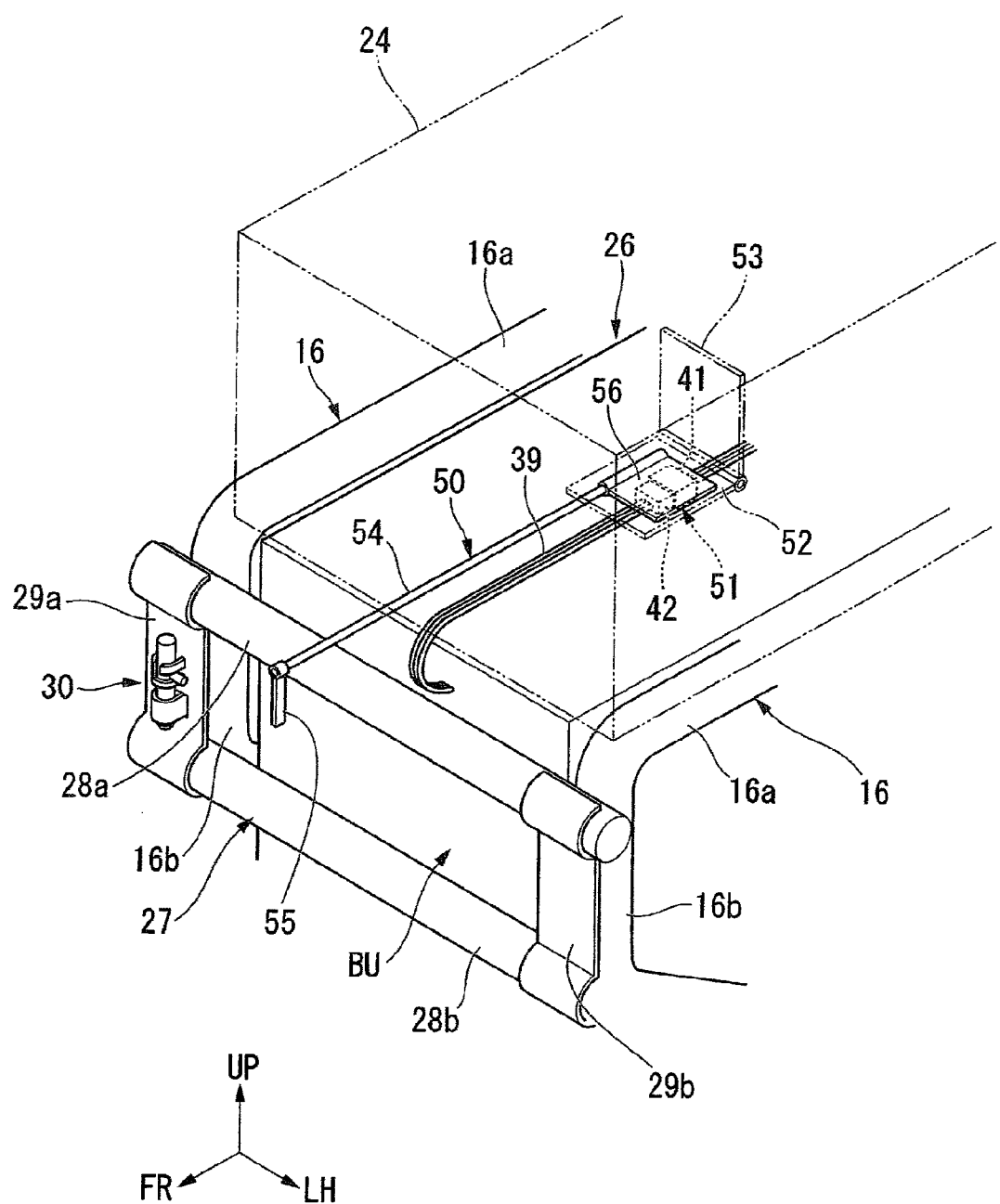
FIG. 13 is a perspective view showing a part of a low-slung electric vehicle according to a second embodiment of the invention.
Figure 14:
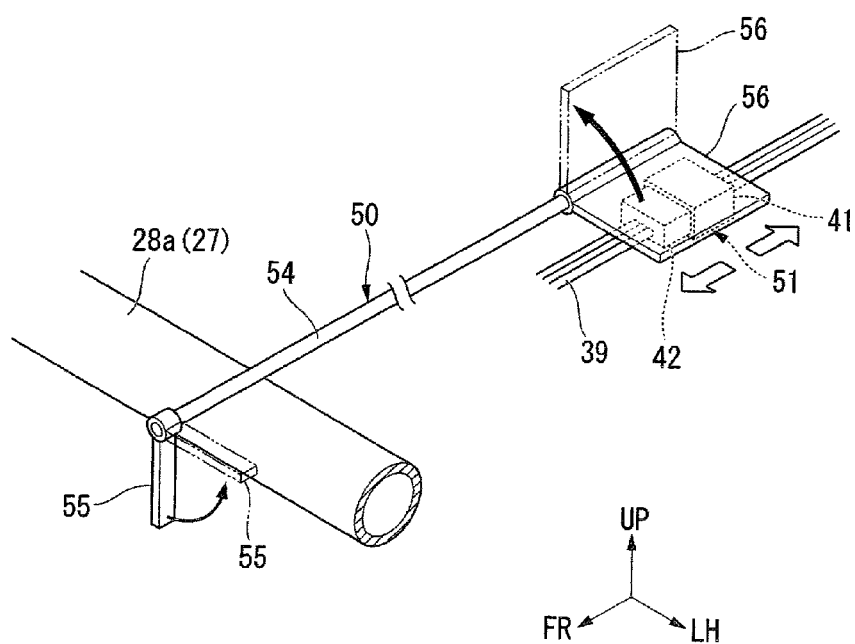
FIG. 14 is an enlarged perspective view showing a part of the low-slung electric vehicle according to the second embodiment of the invention.

Next, description is made on a second embodiment shown in FIG. 13 and FIG. 14. In the following embodiments described below identical elements to those of the first embodiment will be referred to by like reference signs and the description of which is dispensed with.

This second embodiment has a basic structure constructed substantially the same way as that of the first embodiment except for that the connecting cable 39 of the electrode connector 42 is not extended in such a manner as to be looped over the front side of the transverse beam pipe 28a of the access gate 27; that another locking mechanism 50 for the access gate 27 is added and a release operation portion for unlocking the locking mechanism 50 is disposed above a connection portion 51 between the electrode connector 42 and the feeder connector 41 and that the release operation portion and the connection portion 51 can be accessed from above the luggage box 24.

In the case of this embodiment, the connection portion 51 between the electrode connector 42 and the feeder connector 41 is disposed in a space under the luggage box 24 above the battery compartment 26. An access hole 52 providing access to the connection portion 51 is formed at the center of a bottom wall of the luggage box 24. This access hole 52 is openably closed by a cover member 53.

An operation rod 54 extending in the fore-aft direction of the vehicle body is rotatably mounted on top of the battery compartment 26. The operation rod 54 has a lock lever 55 integrally fixed to one end (front end) thereof, and a tabular operation plate 56 (release operation portion) fixed to the other end (rear end) thereof.

The lock lever 55 is disposed forwardly of the transverse beam pipe 28a of the closed access gate 27. When the lock lever 55 is rotated downward with the access gate 27 closed, a distal end portion of the lock lever 55 vertically crosses the front side of the transverse beam pipe 28a of the access gate 27 so as to restrain the operation of opening the access gate 27 (lock the access gate 27).

The operation plate 56 is designed for operating the lock lever 55 via the operation rod 54. When substantially in a horizontal position, the operation plate 56 maintains the lock lever 55 in a lock position. When operatively rotated upward nearly through 90° from this position as indicated by a dotted line in FIG. 14, the operation plate 56 brings the lock lever 55 into the horizontal position, unlocking the lock lever 55.

The operation plate 56 is configured such that when substantially placed in the horizontal position (in the lock position), the operation plate 56 completely covers from above the connection portion 51 between the electrode connector 42 and the feeder connector 41. In this state, therefore, the operation plate 56 obstructs the access to the connection portion 51 from the access hole 52 of the luggage box 24.

To remove the battery unit BU from the battery compartment 26 of the vehicle, the operator may first lift up the seat to open the top of the luggage box 24. In this state, the operator may open the cover member 53 in the bottom of the luggage box 24 so as to open the access hole 52.

In this state, the operator may then lift up the operation plate 56 of the locking mechanism 50 as shown in FIG. 14. Thus, the connection portion 51 between the electrode connector 42 and the feeder connector 41 having been covered by the operation plate 56 is exposed to the above. In conjunction with the rotation of the operation rod 54, the lock lever 55 is substantially brought into the horizontal position so as to unlock the locking mechanism 50. In this state, the operator may disconnect the electrode connector 42 of the battery unit BU from the feeder connector 41.

Subsequently, the operator may open the access gate 27 and extract the battery unit BU from the battery compartment 26 the same way as in the first embodiment.

In this embodiment, the operator who is going to open the access gate 27 in order to remove the battery unit BU must rotate the operation plate 56 of the locking mechanism 50 upwardly via the access hole 52 of the luggage box 24. Therefore, the operator intending to remove the battery unit BU never fails to perform the operation of rotating the operation plate 56 upwardly. At this time, the operator never fails to see the connection portion 51 between the electrode connector 42 and the feeder connector 41 because the connection portion 51 is disposed under the operation plate 56.

In the case of this embodiment, therefore, the vehicle is adapted to urge the operator, who is going to open the access gate 27 to remove the battery unit BU, to disconnect the electrode connector 42 from the feeder connector 41.

In this embodiment, the locking mechanism 50 including the operation plate 56 constitutes the gate restraining means.

Figure 15:
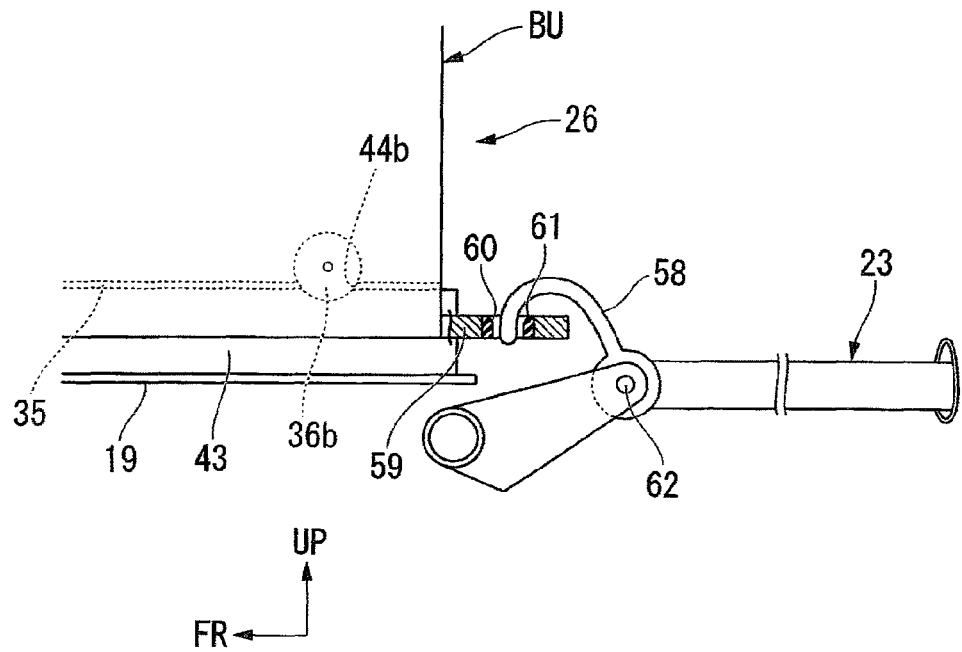
FIG. 15 is a fragmentary sectional side view showing a rear portion of a battery compartment of a low-slung electric vehicle according to a third embodiment of the invention.
Figure 16:
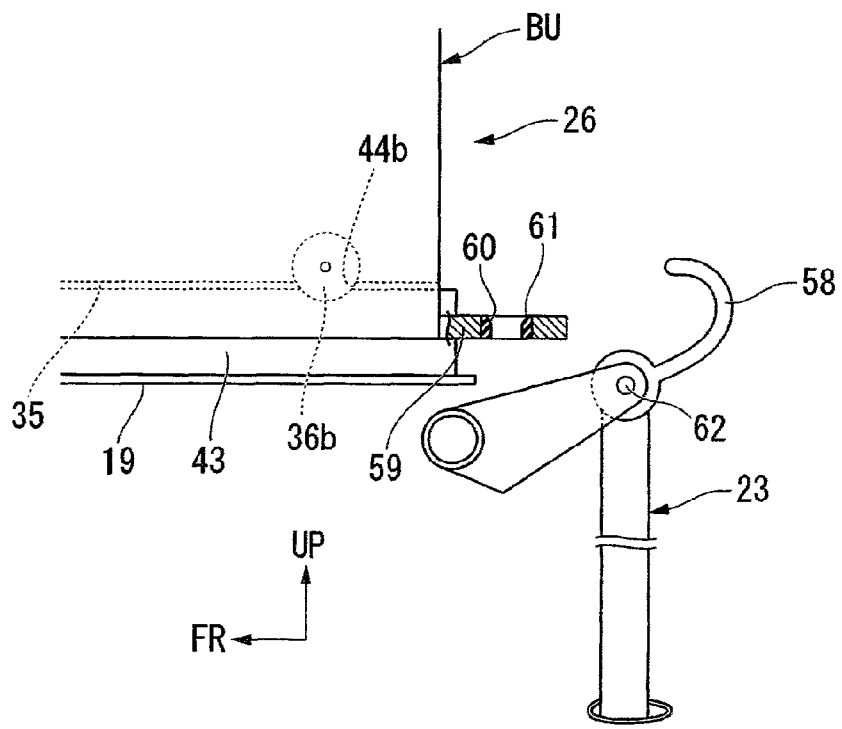
FIG. 16 is a fragmentary sectional side view showing the rear portion of the battery compartment of the low-slung electric vehicle according to the third embodiment of the invention.

Next, a description is made on a third embodiment shown in FIG. 15 and FIG. 16.

This embodiment adds another structure for preventing the rattling of the battery unit BU relative to the structure of the first embodiment or the second embodiment.

A vehicle of this embodiment includes a hook portion 58 for locking and fixing a rear end of the battery unit BU. The hook portion 58 is integrally formed at an upper end of the main stand 23 for allowing the parked vehicle to stand. A flange 59 projects from a lower edge of the rear end of the battery unit BU. The flange 59 is formed with a locking hole 60. The locking hole 60 is equipped with an annular elastic member 61 formed of rubber or soft resin.

With the main stand 23 set on the ground, the hook portion 58 extends upwardly from a pivot 62 of the vehicle body, as shown in FIG. 16. When the main stand 23 in this position is kicked up, as shown in FIG. 15, the hook portion 58 rotates about the pivot 62 to a front low position. A distal end of the hook portion 58 is curved downwardly to the front. When the main stand 23 is kicked up, the hook portion 58 is fittably received in the locking hole 60. When the main stand 23 is set on the ground from this position, the hook portion 58 is drawn upwardly from the locking hole 60.

In this embodiment, the hook portion 58 constitutes rear-side restraining means interlocked with the motion of the main stand 23.

In the case of this embodiment, the same effects as those of the first embodiment and the second embodiment can be provided. Further, this embodiment can offer the following additional effects.

When the rider kicks up the main stand 23 and starts riding the vehicle, the hook portion 58 is fittably received in the locking hole 60 at the rear portion of the battery unit BU and firmly holds down the rear portion of the battery unit BU. Therefore, the hook portion 58 can more positively suppress the rattling of the battery unit BU.

When the main stand 23 is set on the ground for replacement of the battery unit BU, the rear portion of the battery unit BU is automatically released from the restraint by the hook portion 58. Therefore, the battery unit BU can be easily removed from the battery compartment 26 just as in the first embodiment and the second embodiment.

Figure 17:
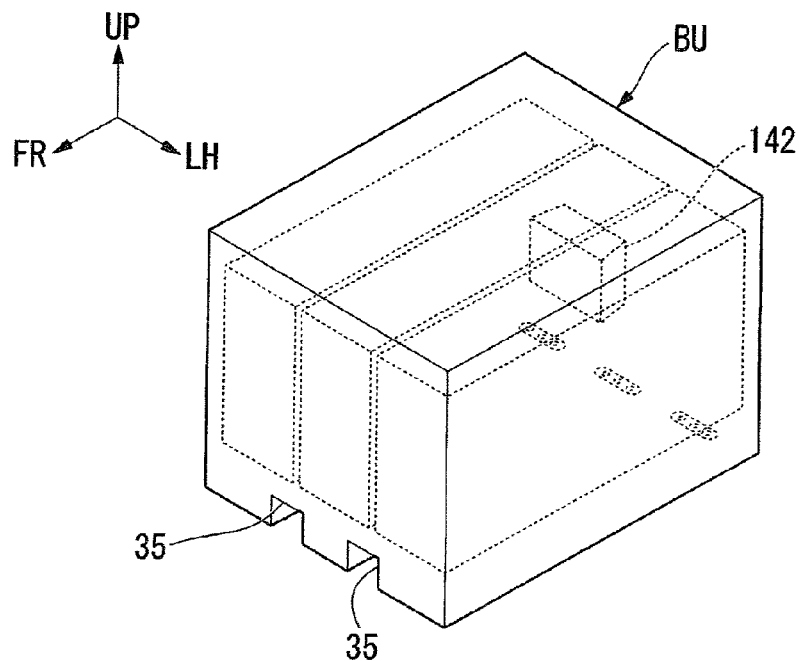
FIG. 17 is a perspective view showing a battery unit of a low-slung electric vehicle according to a fourth embodiment of the invention.
Figure 18:
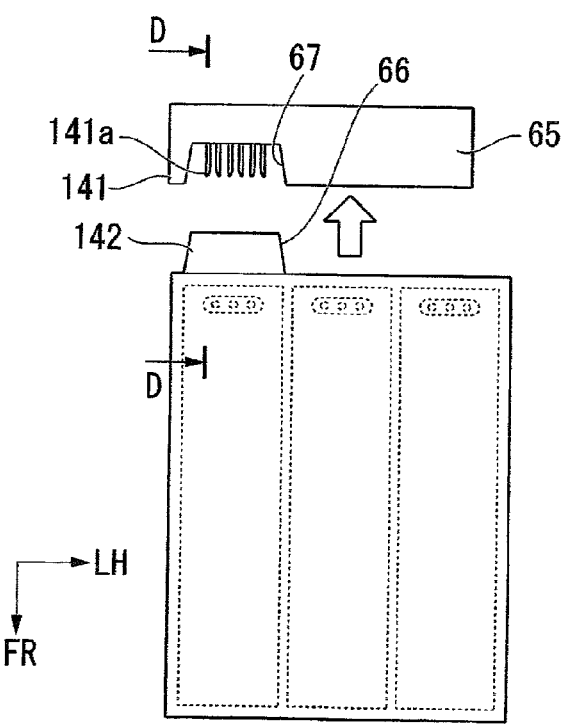
FIG. 18 is an exploded perspective view showing the battery unit and a terminal connection portion of a vehicle body of the low-slung electric vehicle according to the fourth embodiment of the invention.
Figure 19:
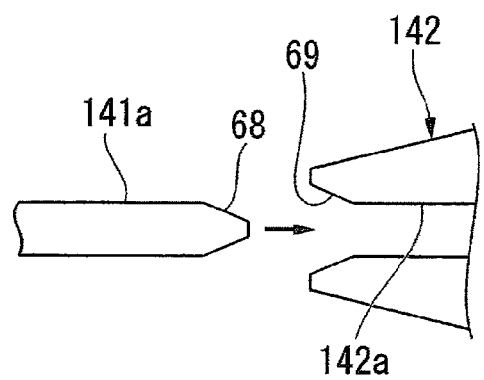
FIG. 19 is a sectional view of the low-slung electric vehicle according to the fourth embodiment of the invention taken on line D-D in FIG. 18.

Lastly, a description is made on a fourth embodiment of the invention shown in FIG. 17 to FIG. 19.

This embodiment is constructed the same way as the first embodiment and the second embodiment in that the battery unit BU is provided with the guide grooves and the rolling rollers while the guide rails are provided on the floor plate of the battery compartment, that the recesses for the rolling rollers to drop into are formed on the guide rails, and that the lower side of the battery unit BU and the upper side of the floor plate are formed with the engaging projections and the engagement holes adapted for fitting with each other. However, this embodiment differs from the first embodiment and the second embodiment in the structure and location of an electrode connector 142 and a feeder connector 141.

More specifically, the battery unit BU has the electrode connector 142 projecting rearwardly from a rear end face thereof. This electrode connector 142 is integrally fixed to the rear end face of the battery unit BU. On the other hand, a rear end portion (bottom portion in an insertion direction) in the battery compartment 26 is provided with an abutment wall 65 against which the rear end of the battery unit BU abuts when the battery unit is accommodated in the battery compartment. The feeder connector 141 of the vehicle body is integrally assembled to the abutment wall 65 at a place opposite to the electrode connector 142 of the battery unit BU.

The electrode connector 142 and the feeder connector 141 are fitted and connected to each other at the point in time when the battery unit BU is moved to the terminal position in the battery compartment 26.

The fitting portions of the electrode connector 142 and the feeder connector 141 are formed with tapered surfaces 66, 67 such as to ensure that terminals 141a, 142a of these connectors are reliably interconnected in spite of some vertical or transverse displacement between these connectors. Similarly, a distal end of the male-type terminal 141a and an end of a female-type terminal 142a are also formed with tapered surfaces 68, 69, as shown in FIG. 19.

This embodiment can offer substantially the same basic effects as those of the first and second embodiments. In addition, this embodiment also has advantages of simplifying the wiring structure and facilitating the operation of mounting and removing the battery unit BU because of the structure in which the electrode connector 142 is connected to the feeder connector 141 when the battery unit BU is moved to the terminal position in the battery compartment 26.

In the case of this embodiment, both the extraction of the battery unit BU and the removal of the electrode connector 142 from the feeder connector 141 are accomplished simultaneously in the removal of the battery unit BU. Thus, the connectors and wirings are not subjected to a heavy load. More specifically, this embodiment is not designed such that these connectors are disconnected from each other when force for extracting the battery unit BU is increased enough. Thus, the load on the connectors and wirings can be reduced.

It is to be noted that the present invention is not limited to the above-described embodiments and a variety of design changes can be made thereto so long as such design changes do not deviate from the scope of the invention. For example, the low-slung electric vehicles of the above embodiments are the scooter-type two-wheeled electric vehicles. However, the low-slung electric vehicle according to the invention is not limited to the above-described two-wheeled electric vehicles and also includes three-wheeled electric vehicles and four-wheeled electric vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low-slung electric vehicle having a battery unit removably mounted in a battery compartment of a vehicle body, comprising:
said battery compartment being disposed under a seat rearwardly of a footrest floor and opened on a front side;
said battery unit being movable in a fore-aft direction of the vehicle body to be inserted from the footrest floor into the battery compartment or to be removed from the battery compartment;
an electrode connector for connecting to a feeder connector of the vehicle body;
a rolling roller mounted on the battery unit for rolling on a track extending in the battery compartment in the fore-aft direction of the vehicle body;
a stopper disposed on the track for the rolling roller for restraining the rolling roller at a predetermined position when the battery unit is moved to a terminal position in the battery compartment;
recessed/projecting fitting portions disposed between a bottom surface in the battery compartment and close to the footrest floor and a lower side of the battery unit corresponding to the bottom surface for fitting with each other when the rolling roller is restrained by the stopper;
an access gate disposed on an opening side of the battery compartment and openably/closably mounted to a frame member of the vehicle body; and
gate restraining means for restraining an operation of opening the access gate after the battery unit is accommodated in the battery compartment;
wherein the gate restraining means is made to release the access gate from restraint by an operation of disconnecting the electrode connector from the feeder connector.

2. The low-slung electric vehicle according to claim 1, wherein a handle portion for an operator to hold is provided at a front end of the battery unit with respect to the vehicle.

3. The low-slung electric vehicle according to claim 2, wherein the gate restraining means includes a connecting cable led out from a main body of the battery unit and connected to the electrode connector, and the electrode connector with the connecting cable looped over a part of the access gate is connected to the feeder connector.

4. The low-slung electric vehicle according to claim 2, wherein the gate restraining means includes a locking mechanism for locking the access gate in a closed state, and a release operation portion for unlocking the locking mechanism, and the release operation portion covers an upper surface of a connection portion between the electrode connector and the feeder connector when placed in a position to lock the locking mechanism but exposes the connection portion between the electrode connector and the feeder connector when placed in a position to unlock the locking mechanism.

5. The low-slung electric vehicle according to claim 2, wherein one of the battery unit and the battery compartment is provided with a guide rail extending in the fore-aft direction of the vehicle body, while the other one of the battery unit and the battery compartment is provided with a guide groove slidably engageable with the guide rail.

6. The low-slung electric vehicle according to claim 2, wherein a locking device for locking the access gate in the closed position is provided independently from the gate restraining means.

7. The low-slung electric vehicle according to claim 2, wherein a rear-side restraining means is disposed on the battery compartment at its bottom in a battery-unit insertion direction, the rear-side restraining means restraining the battery unit as interlocked with a kick-up operation of a main stand of the vehicle and releasing the battery unit from the restraint in conjunction with the main stand set on the ground.

8. The low-slung electric vehicle according to claim 1, wherein the gate restraining means includes a connecting cable led out from a main body of the battery unit and connected to the electrode connector, and the electrode connector with the connecting cable looped over a part of the access gate is connected to the feeder connector.

9. The low-slung electric vehicle according to claim 1, wherein the gate restraining means includes a locking mechanism for locking the access gate in a closed state, and a release operation portion for unlocking the locking mechanism, and the release operation portion covers an upper surface of a connection portion between the electrode connector and the feeder connector when placed in a position to lock the locking mechanism but exposes the connection portion between the electrode connector and the feeder connector when placed in a position to unlock the locking mechanism.

10. The low-slung electric vehicle according to claim 9, wherein a luggage box having a top opening openably closed by the seat is disposed under the seat;
   a bottom wall of the luggage box is formed with an access hole facing the release operation portion of the gate restraining means; and
   the unlocking operation by means of the release operation portion and the operation of disconnecting the electrode connector from the connection portion between the electrode connector and the feeder connector are performed through the access hole.

11. The low-slung electric vehicle according to claim 1, wherein one of the battery unit and the battery compartment is provided with a guide rail extending in the fore-aft direction of the vehicle body, while the other one of the battery unit and the battery compartment is provided with a guide groove slidably engageable with the guide rail.

12. The low-slung electric vehicle according to claim 11, wherein the guide rail projects upwardly from a floor surface in the battery compartment;
   the rolling roller rolls on an upper side of the guide rail; and
   the stopper by which the rolling roller is restrained is formed in the upper side of the guide rail.

13. The low-slung electric vehicle according to claim 1, wherein a locking device for locking the access gate in the closed position is provided independently from the gate restraining means.

14. The low-slung electric vehicle according to claim 1, wherein a rear-side restraining means is disposed on the battery compartment at its bottom in a battery-unit insertion direction, the rear-side restraining means restraining the battery unit as interlocked with a kick-up operation of a main stand of the vehicle and releasing the battery unit from the restraint in conjunction with the main stand set on the ground.

15. A low-slung electric vehicle having a battery unit removably mounted in a battery compartment of a vehicle body, comprising:
   said battery compartment being disposed under a seat rearwardly of a footrest floor and open on a front side;
   said battery unit being movable in a fore-aft direction of the vehicle body to be inserted from the footrest floor into the battery compartment or to be removed from the battery compartment;
   an electrode connector;
   a feeder connector disposed relative to the vehicle body and connected to the electrode connector when the battery unit is mounted to the vehicle;
   a rolling roller mounted to the battery unit for rolling on a track extending in the battery compartment in the fore-aft direction of the vehicle body;
   a stopper disposed on the track for the rolling roller for restraining the rolling roller at a predetermined position when the battery unit is moved to a terminal position in the battery compartment;
   recessed/projecting fitting portions disposed between a bottom surface in the battery compartment and close to the footrest floor and a lower side of the battery unit corresponding to the bottom surface for fitting to each other when the rolling roller is restrained by the stopper;
   wherein the feeder connector is disposed in the battery compartment at its bottom in the battery-unit insertion direction, while the electrode connector is disposed at an end face of the battery unit on a side that is first inserted into the battery compartment; and
   the electrode connector is connected to the feeder connector when the battery unit is moved to the terminal position in the battery compartment.

16. An electric vehicle comprising:
   a battery compartment;
   a battery unit removably mounted in the battery compartment of a vehicle body;
   said battery compartment being disposed under a seat rearwardly of a footrest floor and opened on a front side;
   said battery unit being movable in a fore-aft direction of the vehicle body to be inserted from the footrest floor into the battery compartment or to be removed from the battery compartment;
   a rolling roller mounted on the battery unit for rolling on a track extending in the battery compartment in the fore-aft direction of the vehicle body;
   a stopper disposed on the track for the rolling roller for restraining the rolling roller at a predetermined position when the battery unit is moved to a terminal position in the battery compartment;
   recessed/projecting fitting portions disposed between a bottom surface in the battery compartment and close to the footrest floor and a lower side of the battery unit corresponding to the bottom surface for fitting with each other when the rolling roller is restrained by the stopper;
   an access gate disposed on an opening side of the battery compartment and openably/closably mounted to a frame member of the vehicle body; and
   gate restraining means for restraining an operation of opening the access gate after the battery unit is accommodated in the battery compartment.

17. The electric vehicle according to claim 16, wherein a handle portion for an operator to hold is provided at a front end of the battery unit with respect to the vehicle.

18. The electric vehicle according to claim 17, wherein the gate restraining means includes a connecting cable led out from a main body of the battery unit and connected to an electrode connector, and the electrode connector with the connecting cable looped over a part of the access gate is connected to a feeder connector.

19. The electric vehicle according to claim 17, wherein the gate restraining means includes a locking mechanism for locking the access gate in a closed state, and a release operation portion for unlocking the locking mechanism, and the release operation portion covers an upper surface of a connection portion between an electrode connector and a feeder connector when placed in a position to lock the locking mechanism but exposes the connection portion between the electrode connector and the feeder connector when placed in a position to unlock the locking mechanism.

20. The electric vehicle according to claim 16, wherein the gate restraining means includes a locking mechanism for locking the access gate in a closed state, and a release operation portion for unlocking the locking mechanism, and the release operation portion covers an upper surface of a connection portion between an electrode connector and a feeder connector when placed in a position to lock the locking mechanism but exposes the connection portion between the electrode connector and the feeder connector when placed in a position to unlock the locking mechanism.

* * * * *